Jan. 26, 1965 W. R. SCHILKE ETAL 3,167,456
BATTERY
Filed June 1, 1961 2 Sheets-Sheet 1

INVENTORS
Warren R. Schilke &
Richard O. Watson
ATTORNEY

Jan. 26, 1965   W. R. SCHILKE ETAL   3,167,456
BATTERY

Filed June 1, 1961   2 Sheets-Sheet 2

INVENTORS
Warren R. Schilke &
BY Richard D. Watson

B. N. Shampo
ATTORNEY

United States Patent Office 3,167,456
Patented Jan. 26, 1965

3,167,456
BATTERY
Warren R. Schilke, Anderson, and Richard D. Watson, Chesterfield, Ind., assignors to General Motors Corporation, Detroit, Mich., a corporation of Delaware
Filed June 1, 1961, Ser. No. 114,141
5 Claims. (Cl. 136—10)

This invention relates to batteries and more particularly to a bipolar electrode and to batteries formed with bipolar electrodes.

While bipolar electrodes have previously been known, all of the bipolar electrodes, heretofore, were made with active electrode materials disposed on opposite transverse surfaces of the bipolar electrode. It was neither recognized nor appreciated that another bipolar electrode design could also be used and that this other design permitted a much wider latitude in battery construction than the pre-existing design.

It is an object of this invention to provide a bipolar element which has positive and negative electrode materials noncontiguously laterally disposed on the same surface.

It is a further object of the invention to provide a compact high power battery having bipolar electrodes.

Another object of the invention is to provide an annular battery having arcuate bipolar plates and more specifically to provide an annular battery having overlapping arcuate plates which are arranged in helical fashion.

Other objects, features and advantages of the present invention will become more apparent from the following description of preferred embodiments thereof and from the drawings, in which.

Figure 4:
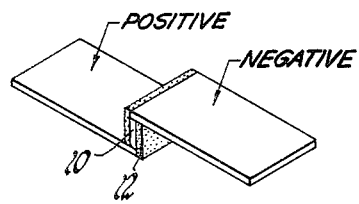
Figure 7:
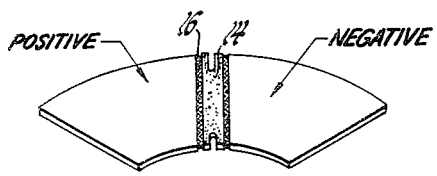
Figure 5:
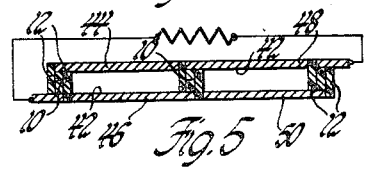
Figure 6:
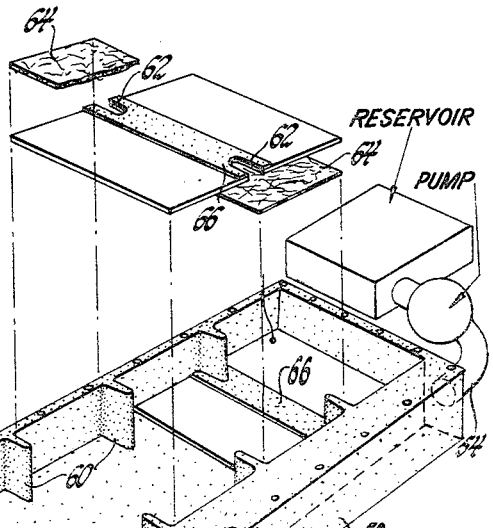
Figure 8:
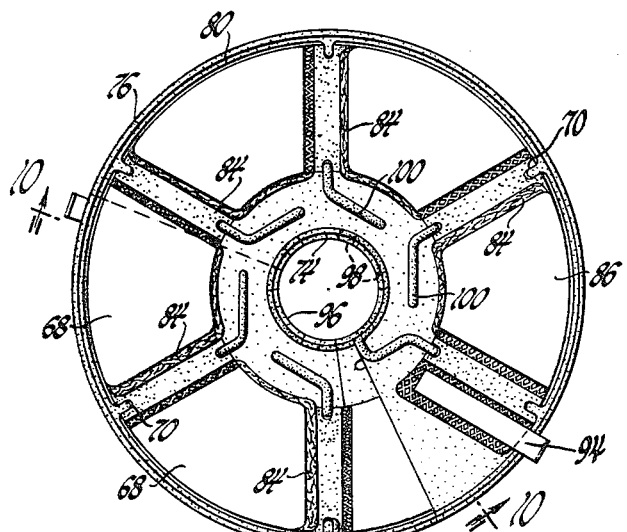
Figure 9:
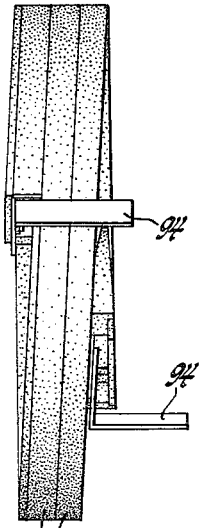
Figure 10:
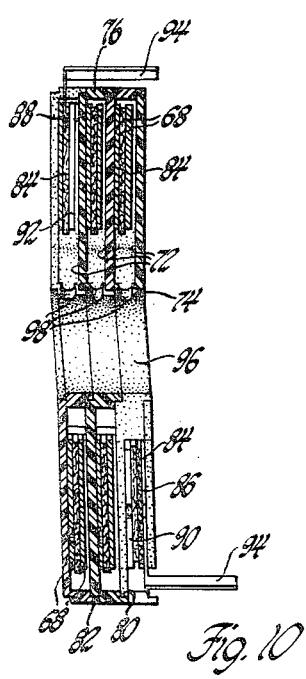

FIGURE 4 perspectively shows a schematic view of a stair-shaped rectangular bipolar electrode;

FIGURE 5 schematically shows a multi-cell battery made with electrodes such as are shown in FIGURE 4;

FIGURE 6 schematically shows a battery construction using our flat bipolar electrodes;

FIGURE 7 shows an arcuate bipolar electrode in perspective;

FIGURE 8 is an elevational view of an annular battery formed in accordance with the invention;

FIGURE 9 shows a side view of the battery shown in FIGURE 8;

FIGURE 10 shows a sectional view along the line 10—10 of FIGURE 8; and

Figure 11:
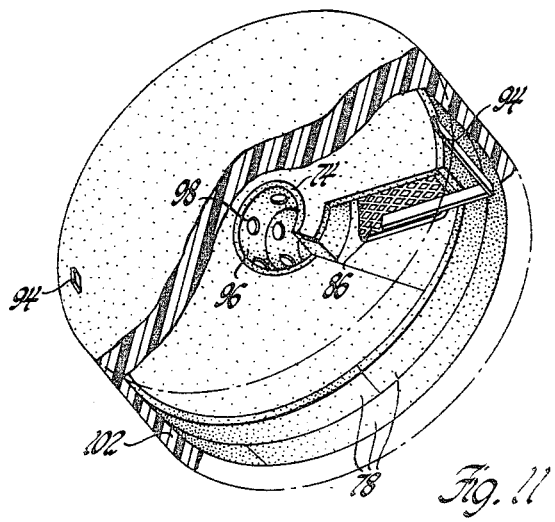

FIGURE 11 perspectively shows with parts broken away the battery construction shown in FIGURE 8.

Briefly, the invention comprehends forming a battery with a plurality of bipolar electrodes in which each of the bipolar electrodes has a surface with two separate and independent areas containing electrochemically active materials. Preferably these materials are electrochemically active with respect to one another so that a plurality of similar bipolar plates can be overlapped to form a battery with no intercell connections.

Figure 1:
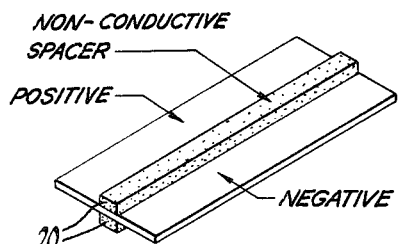
FIGURE 1 shows a schematic elevational view in perspective of a flat rectangular bipolar electrode formed in accordance with the invention.

Referring now to FIGURE 1, a bipolar electrode is formed in accordance with the invention by applying a positive electrode material to about one half of a flat rectangular conductor. A negative electrode material is applied to the other half of the flat rectangular conductor. The positive and negative portions of the conductor are separated by a nonconductive spacer so that the positive and negative portions of the conductor are noncontiguous one another.

A bipolar electrode can readily be formed by impregnating appropriate portions of a flat rectangular conductor made of a suitable expanded metal in the normal and accepted manner. Other reticulate conductors such as woven metal mesh can also be used. The specific metal selected for the conductor can be of any appropriate metal. Silver is an appropriate conductor for a silver oxide-zinc reserve-type battery.

FIGURES 4 and 7 illustrate other modifications of a bipolar electrode which is formed in accordance with the invention. FIGURE 4 shows a stair-shaped electrode which is rectangular in general configuration. The two steps, respectively, form positive and negative portions of the bipolar electrode. The riser 10 between these steps is not electrochemically active and has a nonconductive spacing material 12 applied to both sides.

The bipolar electrode shown in FIGURE 7 is arcuate in configuration to permit formation of an annular battery which is hereinafter more fully described. This electrode as in previous modifications has a positive end and a negative end which are noncontiguous and laterally spaced from one another with an insulating spacer 14 therebetween. In this modification of the invention an expanded metal mesh 16 is used as a matrix into which the active electrode materials are embedded. The materials are not contiguous the nonconductive spacer, providing a perforate area between the spacer and the active portions of the electrode. This modification may be preferred in some instances, such as to facilitate electrolyte distribution in a battery.

Figure 2:
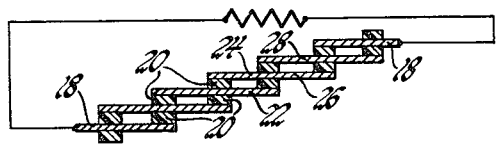
FIGURE 2 shows a schematic view of the manner in which the plates shown in FIGURE 1 can be arranged to obtain a multi-cell battery.

FIGURE 2 schematically illustrates the manner in which a five cell battery can be formed using bipolar electrodes such as shown in FIGURE 1. The end electrodes 18 are unipolar electrodes with the balance of the electrodes in the series being bipolar electrodes. The nonconductive spacers 20 not only serve to insulate the positive and negative portions of the bipolar electrode from one another but also can serve as separators between overlapping portions of the electrodes, as shown.

The electrodes are arranged in the normal and accepted manner for a voltaic cell. Thus, the negative portion 22 of the bipolar electrode is matched with the positive portion 24 of the next adjacent bipolar electrode to form a voltaic cell. The negative portion 26 of that next adjacent bipolar electrode is then matched with the positive portion 28 of still another bipolar electrode to form another voltaic cell. This arrangement is continued until the desired number of voltaic cells have been formed. The first and last cells in the series, of course, are each formed with a unipolar electrode 18 and a bipolar electrode. The unipolar electrodes are appropriately connected to an external resistance to use power generated by the battery.

As previously indicated, the nonconductive spacer not only serves to isolate the positive and negative portions of a bipolar electrode from one another but can also be used to space matched positive and negative portions of two bipolar elements to eliminate the need for a porous separator. Moreover, if the nonconductive spacer is formed of a resilient material, the spacer can also function as a seal between the respective voltaic cells in the battery to prevent undesirable bipolar effects which might result by placing two separate voltaic cells in ionic communication through a common electrolyte. Moreover, such an arrangement would also permit one to employ bipolar plates in which a plurality of different electrochemical systems are used to form different voltaic cells for the same battery and allow use of different electrolytes in each cell, should it be desired.

Figure 3:
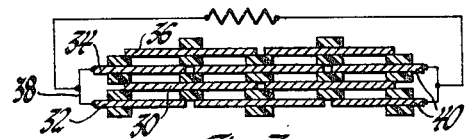
FIGURE 3 shows another multi-cell battery made with bipolar plates such as shown in FIGURE 1.

FIGURE 3 schematically shows a battery which includes the arrangement of plates shown in FIGURE 2. In addition, there are included other bipolar plates which, in essence, produce plural plate voltaic cells. Each cell has two negative elements and two positive elements which are alternately disposed and appropriately externally connected in parallel to increase the capacity of the battery.

In this arrangement a positive portion 30 of a first bipolar electrode is disposed between two negative electrodes 32 and 34. One of the latter 34 is, in turn, disposed between two positive portions 30 and 36 of the first and second bipolar electrodes. The negative electrodes are joined to a common conductor 38 to provide a parallel electron connection therebetween.

The negative portions of the bipolar electrodes are appropriately matched with the positive portions of an additional group of bipolar electrodes. Still another group of bipolar electrodes are added, and mated with this group are the unipolar electrodes 40 which complete the battery. Power is obtained from the battery by appropriately connecting the unipolar electrodes 32, 34 and 40 to an external resistance.

Thus, the capacity of our battery, as shown in FIGURE 3, can be increased merely by increasing the number of bipolar plates in the stacks of plates. The potential of the battery is increased by adding another stack of bipolar plates to the group of stacks forming the battery. It is, therefore, apparent that our invention is not restricted to a voltaic cell having a single positive electrode portion and a single negative electrode portion but can be used to produce a voltaic cell having any number of positive and negative plates, or electrode portions.

Referring now to FIGURE 5, a battery construction is shown to schematically illustrate use of the stair-shaped electrode shown in FIGURE 4. In this modification of the invention a substantially flat battery can be formed in which the nonconductive resilient spacers 12 on either side of the riser portion 10 of the electrode not only isolate adjacent portions on the same bipolar electrode but also isolate adjacent bipolar electrodes from one another. In addition the spacers 12 serve as seals to form isolated electrolyte chambers 42.

The modification shown in FIGURE 5 includes a stair-shaped bipolar electrode having positive and negative portions disposed on separate steps of the stair. A positive unipolar electrode 44, as in the preceding modification, is mated with the negative portion 46 of the bipolar electrode to produce the first cell. The positive portion 48 of the bipolar electrode is matched with a negative unipolar electrode 50 to produce the second cell. The unipolar electrodes 44 and 50 are formed of the same general configuration as the bipolar electrodes merely for convenience. Power generated by the battery is used by appropriately connecting the end electrodes 44 and 50 to an external resistance.

To more clearly show the manner of realizing our invention, reference is now made to FIGURE 6. There is shown a battery case 52 to which a reservoir is connected by means of a conduit 54. The battery case has a manifold 56 therein for introducing an electrolyte into the various voltaic cells comprising the battery. The electrolyte is transferred from the reservoir into the manifold 56 and then into the respective voltaic cells by means of a pump. The manifold is provided with a plurality of apertures, such as that shown at 58, so that the electrolyte can pass from the manifold into the various portions of the battery.

The battery is formed with a plurality of overlapping bipolar plates which are generally like that shown in FIGURE 1. The battery case has bosses 60 thereon and the battery plates are notched at 62 to facilitate assembly operations. A porous separator 64 is positioned between the overlapping portions of the plates to insure proper spacing and uniform electrolyte distribution. If desired, however, the separators can be omitted, if not needed to attain uniform electrolyte distribution and the central nonconductive spacer 66 is adequately designed, as shown in FIGURES 2 and 3.

The subject invention is of particular importance in that it permits the formation of extremely compact but relatively high power batteries, such as those needed for missile applications. Missile batteries are generally of the silver oxide-zinc reserve-type which are activated by introduction of an aqueous potassium hydroxide electrolyte solution into the battery immediately prior to use.

Another arrangement which can be used to form an extremely compact reserve-type battery is shown in connection with FIGURES 8 through 11. The battery shown in FIGURES 8 through 11 is essentially formed in the manner in which the battery illustrated in FIGURE 6 is formed. However, by employing arcuate bipolar plates, overlapping plates 68 form a generally annular battery. When extended sufficiently, the line of overlapping plates forms a helix. The plates are notched at 70, as are the plates shown in FIGURE 6, to facilitate assembly operations.

In this arrangement the overlapping arcuate bipolar plates are disposed in a battery case having a helical chamber 72 therein. The chamber is disposed between an inner circumferential wall 74 and an outer circumferential wall 76, thus presenting a battery which is annular in configuration.

The battery case is formed of a plurality of interlocking segments 78 in order to facilitate assembly of the battery. Each of the segments is a cup-shaped member which is relieved on the inner periphery of its upper edge 80 and on the outer periphery of its lower edge 82. When assembled, the various segments of the case interlock with one another to define the helical chamber 72 within which the overlapping battery plates 68 are disposed. All joints, of course, are adequately sealed to form imperforate junctions between all mating parts of the battery case. The assembled segments present a continuous single wall within the case to define the helical chamber therewithin.

In making our helical battery, the arcuate bipolar plates are disposed within each segment of the case in overlapping relationship, as previously described. To insure proper electrode spacing and to concurrently insure adequate electrolyte distribution throughout surfaces of the plates, it is preferred to employ porous separators 84 between the overlapping portions of the plates. As in the previously described modifications of the invention, the first electrode 86 and the last electrode 88 of the series are unipolar electrodes. For example, the positive unipolar electrode 86 overlaps the negative portion 90 of an arcuate bipolar electrode, a porous spacer 84 being therebetween. The positive portion of that bipolar electrode overlaps the negative portion of another bipolar electrode, a porous separator being therebetween. This overlapping disposition of bipolar electrodes is continued until a sufficient number of bipolar electrodes have been used to obtain the desired potential for the battery. At the opposite end of the series, a unipolar negative electrode 88 is overlapped by the positive portion of a bipolar electrode 92. Terminals 94 are provided on the unipolar electrodes to which terminal leads can be attached to draw power from the battery.

The inner circumferential wall of the helical battery forms a manifold chamber 96 into which electrolyte can be introduced to activate the entirety of the battery simultaneously. Means (not shown) can be provided to introduce electrolyte into the manifold chamber 96. Electrolyte within the chamber 96 passes through a plurality of ports 98 in the wall into the battery chamber 72 containing the plates. If the electrolyte is injected into the battery under a high pressure, electrolyte passing through the ports 98 may form a high pressure jet which damages the battery plates. In such instances, it is preferred that the plate locating elements in the battery case be extended to form deflecting walls 100 on which the jets of incoming electrolyte impinge. The electrolyte jet impinging on the wall is deflected, thereby reducing the effect of the incoming electrolyte stream on the battery components.

A convenient means of strengthening the battery assembly is by potting the case in a suitable plastic. In this manner not only is the segmented case strengthened to withstand high pressure electrolyte injection but also sealed to insure that electrolyte leakage from the case is avoided. As shown in FIGURE 11, a suitable plastic 102, such as epoxy resin or polyester resin, is cast around the completed battery assembly with only the unipolar electrode terminals 94 projecting from the cast potting resin. Suitable means (not shown), of course, are provided during potting to avoid casting resin entering within the helical chamber or within the electrolyte manifold 96. If desired, appropriate means for attaching an electrolyte reservoir to the electrolyte manifold can be cast into the potted assembly.

Although this invention has been described in connection with certain specific examples thereof, no limitation is intended thereby except as defined in the appended claims.

We claim:

1. A battery comprising a plurality of bipolar electrodes, each of said electrodes including a conductive support, a portion of the surface on said support having an electropositive material thereon and a noncontiguous portion of said surface having an electronegative material thereon, the electronegative portion of a first plate being spaced from and overlapping the electropositive portion of the second plate, the electronegative portion of the second plate being spaced from and overlapping the electropositive portion of the third plate, the first and third plates being in substantially nonoverlapping disposition, and an electrolyte providing ion communication between said overlapping plate portions.

2. A battery as defined by claim 1 being formed of at least three bipolar electrodes and nonconducting means on each of said electrodes for separating the electrode materials from each other and for spacing the overlapping mating electrode portions.

3. A battery as defined by claim 1 being formed of at least two stair-shaped bipolar electrodes with each electrode having at least two steps and a communicating riser section therebetween, an electropositive material on one step and an electronegative material on the other step.

4. A battery as described in claim 1 formed of at least two stair-shaped bipolar electrodes, with each of said electrodes having at least two steps and a communicating riser section therebetween, an electropositive material on one step, an electronegative material on the other step and a nonconductive means for maintaining a separation between said riser section and the overlapping end portion of the next adjacent bipolar electrode.

5. A battery as defined by claim 1 having at least three arcuately shaped bipolar electrodes in the overlapping disposition forming a generally helical construction.

References Cited in the file of this patent

UNITED STATES PATENTS

| | | |
|---|---|---|
| 823,983 | Kother | Oct. 9, 1906 |
| 2,624,767 | Moulton | Jan. 6, 1953 |
| 2,661,388 | Warner et al. | Dec. 1, 1953 |
| 2,678,342 | Porter | May 11, 1954 |
| 2,684,989 | Wilburn | July 27, 1954 |
| 2,870,235 | Soltis | Jan. 20, 1959 |
| 2,931,849 | Burrell | Apr. 5, 1960 |
| 2,988,587 | Haring | June 13, 1961 |
| 3,003,013 | Duddy | Oct. 3, 1961 |
| 3,003,016 | Marsal | Oct. 3, 1961 |
| 3,087,003 | Drengler et al. | Apr. 23, 1963 |

UNITED STATES PATENT OFFICE
CERTIFICATE OF CORRECTION

Patent No. 3,167,456

January 26, 1965

Warren R. Schilke et al.

It is hereby certified that error appears in the above numbered patent requiring correction and that the said Letters Patent should read as corrected below.

Column 6, line 25, for "823,983" read -- 832,983 --.

Signed and sealed this 1st day of June 1965.

(SEAL)
Attest:

ERNEST W. SWIDER
Attesting Officer

EDWARD J. BRENNER
Commissioner of Patents